(12) United States Patent
Ding et al.

(10) Patent No.: US 10,731,995 B2
(45) Date of Patent: *Aug. 4, 2020

(54) GENERATING A ROAD NETWORK FROM LOCATION DATA

(71) Applicant: International Business Machines Corporation, Armonk, NY (US)

(72) Inventors: Jian Dong Ding, Shanghai (CN); Ning Duan, Beijing (CN); Peng Gao, Beijing (CN); Peng Ji, Nanjing (CN); Xin Zhang, Beijing (CN); Qian Kun Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/441,285

(22) Filed: Feb. 24, 2017

(65) Prior Publication Data

US 2017/0167880 A1    Jun. 15, 2017

Related U.S. Application Data

(63) Continuation of application No. 14/738,971, filed on Jun. 15, 2015, now Pat. No. 9,631,935.

(30) Foreign Application Priority Data

Jun. 27, 2014    (CN) .......................... 2014 1 0302599

(51) Int. Cl.
*G01C 21/30* (2006.01)
(52) U.S. Cl.
CPC .................. *G01C 21/30* (2013.01)

(58) Field of Classification Search
CPC ...................................................... G01C 21/30
(Continued)

(56) References Cited

U.S. PATENT DOCUMENTS 7,024,307 B2 *  4/2006  Ito .......................... G01C 21/30
                                                         701/446
7,831,389 B2    11/2010  Yamada
(Continued)

FOREIGN PATENT DOCUMENTS

CN           101520331 A      9/2009
CN           101842662 A      9/2010
(Continued)

OTHER PUBLICATIONS

Butenuth, "Geometric Refinement of Road Networks Using Network Snakes and SAR Images", http://geodesy.unr.edu/hanspeterplag/library/IGARSS2010/pdfs/1864.pdf, 2010, pp. 1-4.
(Continued)

*Primary Examiner* — Thomas G Black
*Assistant Examiner* — Luat T Huynh
(74) *Attorney, Agent, or Firm* — L. Jeffrey Kelly

(57) ABSTRACT

The present disclosure relates to a method and system for generating a road network. An embodiment of the present invention provides a method comprising: identifying a target area to be refined in a road network skeleton; and refining the target area using at least one trajectory associated with the target area to generate the road network. Another embodiment of the present invention provides a corresponding system.

18 Claims, 5 Drawing Sheets

(58) Field of Classification Search
USPC .......................................................... 701/532
See application file for complete search history.

(56) References Cited

U.S. PATENT DOCUMENTS

| | | | |
|---|---|---|---|
| 7,949,466 B2* | 5/2011 | Atarashi | G01C 21/32 |
| | | | 340/988 |
| 8,271,190 B2 | 9/2012 | Smartt | |
| 8,396,660 B2 | 3/2013 | Takahata et al. | |
| 8,463,542 B2 | 6/2013 | Pfeiffer et al. | |
| 8,566,021 B2* | 10/2013 | Smartt | G01C 21/32 |
| | | | 701/409 |
| 8,825,359 B1 | 9/2014 | Wolf | |
| 8,949,021 B2 | 2/2015 | Witmer | |
| 9,109,909 B2* | 8/2015 | Schilling | G01C 21/32 |
| 9,310,210 B2 | 4/2016 | Stählin | |
| 9,404,757 B2 | 8/2016 | Duan et al. | |
| 2007/0191029 A1 | 8/2007 | Zarem | |
| 2009/0005980 A1* | 1/2009 | Nakao | G01C 21/28 |
| | | | 701/414 |
| 2009/0138188 A1 | 5/2009 | Kores | |
| 2012/0262482 A1 | 10/2012 | Miwa | |
| 2012/0277993 A1 | 11/2012 | Mund | |
| 2013/0332476 A1 | 12/2013 | Sinha et al. | |
| 2014/0163872 A1 | 6/2014 | Schilling | |
| 2015/0198449 A1 | 7/2015 | Okude | |
| 2015/0300835 A1 | 10/2015 | Fowe | |
| 2015/0377629 A1 | 12/2015 | Duan | |
| 2015/0377636 A1 | 12/2015 | Ding et al. | |
| 2016/0282135 A1 | 9/2016 | Duan et al. | |
| 2016/0290813 A1 | 10/2016 | Duan et al. | |
| 2016/0298973 A1 | 10/2016 | Duan et al. | |
| 2016/0313129 A1 | 10/2016 | Duan et al. | |
| 2016/0334222 A1 | 11/2016 | Duan et al. | |
| 2016/0334223 A1 | 11/2016 | Duan et al. | |
| 2016/0334224 A1 | 11/2016 | Duan et al. | |
| 2016/0334226 A1 | 11/2016 | Duan et al. | |

FOREIGN PATENT DOCUMENTS

| | | |
|---|---|---|
| CN | 101464158 B | 4/2011 |
| CN | 102713521 A | 10/2012 |
| CN | 102713521 B | 10/2012 |
| CN | 103309888 A | 9/2013 |
| CN | 102436469 B | 11/2014 |
| CN | 103499828 B | 7/2015 |
| CN | 105205196 A | 12/2015 |
| CN | 105225510 A | 1/2016 |
| EP | 2455714 A1 | 5/2012 |
| WO | 2010105712 A1 | 9/2010 |
| WO | 2011023245 A1 | 3/2011 |
| WO | 2012089271 A1 | 7/2012 |
| WO | 2014024773 A1 | 2/2014 |

OTHER PUBLICATIONS

Garcia et al., "Gap Detection in Road Networks", UCLA Department of Mathematics, http://www.math.ucla.edu/~wittman/reu2008/Reports/road_report.pdf, Aug. 8, 2008, pp. 1-18.
Luan et al., "Generating Strokes of Road Networks Based on Pattern Recognition", 13th ICA Workshop on Generalisation and Multiple Representation, Sep. 12-13, 2010, Zurich, Switzerland, http://www.researchgate.net/publication/228562636_Generating_Strokes_of_Road_Networks_Based_on_Pattern_Recognition, pp. 1-8.
IBM: List of IBM Patents or Patent Applications Treated as Related (Appendix P), Mar. 3, 2017, pp. 1-2.

* cited by examiner

GENERATING A ROAD NETWORK FROM LOCATION DATA

BACKGROUND

The present invention generally relates to a method and system for generating a road network, and more specifically to continuously updating the road network based upon live feedback from location data generating devices.

In connected vehicles, intelligent transportation or location based service (LBS), road network provides fundamental information to support other services. As used herein, the term "road network" used here refers to a kind of map that mainly shows information about roads and traffic routes, rather than natural geographical information and other information. At present, due to restrictions in aspects such as policies, it is hard to freely obtain and use road network information. Traditionally, users must purchase road network data (purchase in lump, or purchase by use times). Therefore, it is desirable to generate and provide road network in a more convenient and flexible way.

In recent years, positioning functions of vehicles and portable computing devices have been constantly enhanced. For example, many devices such as vehicles, mobile phones and personal digital assistants (PDA) are all equipped with global positioning systems (GPS) or other navigation/positioning systems. During the process of traveling along a specific route or line, a vehicle or person can continuously or periodically obtain location data representing a plurality of locations. However, currently, there is no method that can generate road network efficiently and accurately using location data such as GPS data while traveling.

First, many users provide their location data voluntarily, but they always do not travel according to pre-planned routes. The uncertainness of routes may cause the location data to be dispersed and irregular. Moreover, the location data provided by the users may have a larger discrepancy and lack basic topological information required for generating a road network. Moreover, the data volume of location data may be rather considerable, which brings challenges to processing speed and efficiency. As a result, it is difficult to generate the road network efficiently and accurately based on dispersed location data.

SUMMARY

In general, an embodiment of the present invention provides a technical solution for generating a road network.

An embodiment of the present invention provides a method for generating the road network. The method includes identifying a target area to be refined in a skeleton of the road network; and refining the target area using at least one trajectory associated with the target area.

Another embodiment of the present invention provides a system for generating the road network. The system includes a target area identifying unit configured to identify a target area to be refined in a road network skeleton; and a target area refining unit configured to refine the target area using at least one trajectory associated with the target area.

It is to be understood through the following description that according to an embodiment of the present invention, the road network is generated by refining the road network skeleton. In an embodiment, the road network skeleton can be generated quickly based on a plurality of locations that have already been detected. Based on relevant factors such as connectivity, one or more areas to be refined in the road network can be accurately identified. Then these areas may be refined using relevant trajectories. In this way, a complete and coherent road network can be obtained by organically combine image processing technologies and trajectory information. Moreover, with the lapse of time, the road network may be constantly perfected or updated using incremental trajectories obtained subsequently. According to an embodiment of the present invention, when the locations for generating a road network skeleton are distributed unevenly, the accuracy of the road network can also be ensured. Other features and advantages of the present invention will become more comprehensible through the description below.

BRIEF DESCRIPTION OF THE SEVERAL VIEWS OF THE DRAWINGS

Through the more detailed description of an embodiment of the present disclosure in the accompanying drawings, the above and other objects, features and advantages of the present disclosure will become more apparent, wherein.

In respective figures, same or like reference numerals are used to represent the same or like components.

DETAILED DESCRIPTION

A preferred embodiment will be described in more detail with reference to the accompanying drawings, in which the preferred embodiment of the present disclosure have been illustrated. However, the present disclosure can be implemented in various manners, and thus should not be construed to be limited to an embodiment disclosed herein. On the contrary, an embodiment is provided for the thorough and complete understanding of the present disclosure, and completely conveying the scope of the present disclosure to those skilled in the art.

Figure 1:
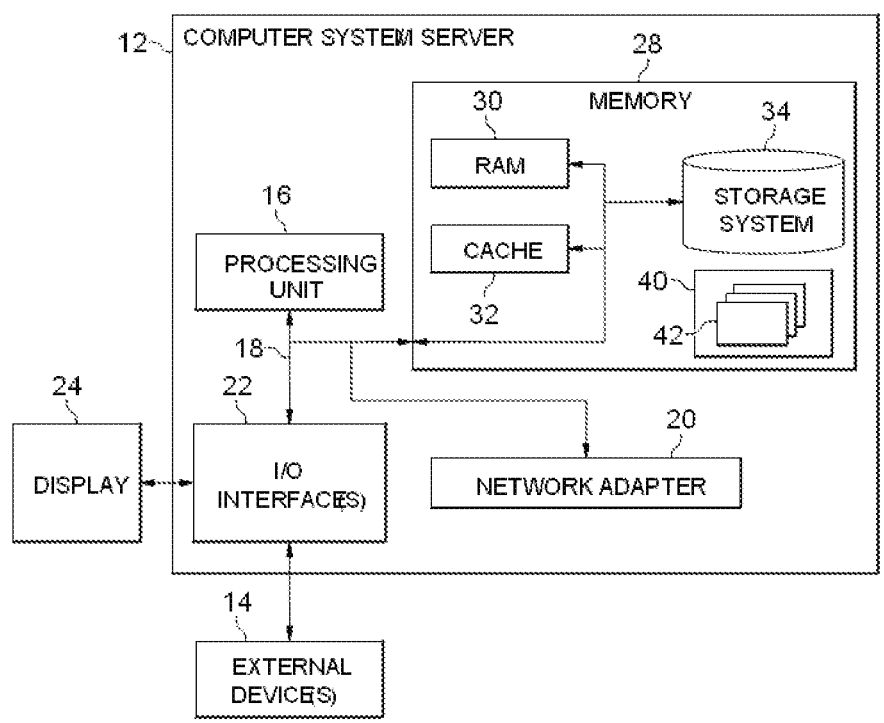
FIG. 1 shows an exemplary computer system/server which is applicable to implement an embodiment of the present invention.

Referring now to FIG. 1, in which an exemplary computer system/server 12 which is applicable to implement an embodiment of the present invention is shown. The computer system/server 12 is only illustrative and is not intended to suggest any limitation as to the scope of use or functionality of an embodiment of the invention described herein.

As shown in FIG. 1, the computer system/server 12 is shown in the form of a general-purpose computing device. The components of the computer system/server 12 may include, but is not limited to, one or more processors or processing units 16, a system memory 28 or memory 28, and a bus 18 that couples various system components including the system memory 28 to a processing unit 16.

The bus 18 represents one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, and it includes both volatile and non-volatile media, removable and non-removable media.

The system memory 28 can include computer system readable media in the form of volatile memory, such as a random access memory (RAM) 30 and/or a cache memory or a cache 32. The computer system/server 12 may further include other removable/non-removable, volatile/non-volatile computer system storage media. By way of example only, a storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to the bus 18 by one or more data media interfaces. As will be further depicted and described below, the memory 28 may include at least one program product having a set (e.g., at least one) of program modules that are configured to carry out the functions of an embodiment of the invention.

A program/utility 40, having a set (at least one) of a program module 42, may be stored in the memory 28 by way of an example, and not a limitation, in addition to an operating system, one or more application programs, other program modules, and program data. Each of the operating systems, one or more application programs, other program modules, and program data or some combination thereof, may include an implementation of a networking environment. The program module 42 generally carries out the functions and/or methodologies of an embodiment of the invention as described herein.

The computer system/server 12 may also communicate with an external device 14 such as a keyboard, a pointing device, a display 24, etc. The external device 14 enables a user to interact with the computer system/server 12; and/or any external device 14 (e.g., network card, modem, etc.) that enable the computer system/server 12 to communicate with one or more external devices 14. Such communication can occur via an input/output (I/O) interface 22. Still yet, the computer system/server 12 can communicate with one or more networks such as a local area network (LAN), a general wide area network (WAN), and/or a public network (e.g., the Internet) via the network adapter 20. As depicted, the network adapter 20 communicates with the other components of the computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Hereinafter, an embodiment of the present invention will be described in detail. According to an exemplary embodiments of the present invention, a road network is generated by refining the road network skeleton. The road network skeleton or skeleton may be quickly generated based on a plurality of detected locations. Based on relevant factors such as connectivity and location distribution and the like, one or more areas that need to be refined in the road network may be accurately identified. Then, a relevant trajectory can be used to refine these areas. In this way, a complete and coherent road network may be obtained by organically combining the image processing technologies and trajectory information. Additionally, with the elapse of time, the road network can be constantly perfected using incremental trajectories obtained subsequently. According to an embodiment of the present invention, when the locations for generating the skeleton are distributed unevenly, the accuracy of road network can still be ensured.

Figure 2:
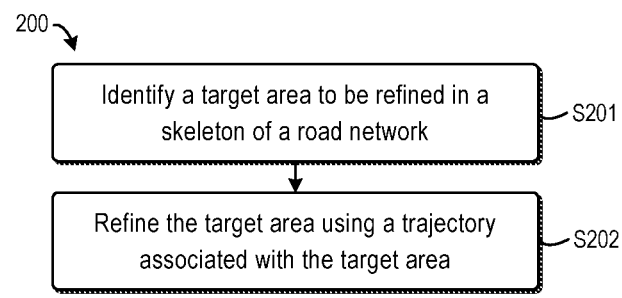
FIG. 2 shows a schematic flow diagram of a method for generating a road network according to an embodiment of the present invention.

FIG. 2 shows a flow diagram of a method 200 for generating the road network skeleton, according to an embodiment of the present invention. The method 200 is begun at step S201, where a to-be-refined area is identified in the skeleton. For the convenience of discussion, an area that needs further refinement in the skeleton is called "a target area." As used herein, the term "road network skeleton" or shortly "skeleton" refers to a rough version of a road network which contains basic information.

According to an embodiment of the present invention, the road network skeleton may be obtained in any appropriate manner. For example, in an embodiment, the skeleton is generated based on location data representing a plurality of locations. As an example, the locations may be detected continuously or periodically using a positioning device on a vehicle or mobile user equipment. Examples of the positioning device may include, but are not limited to, a GPS receiver, a Galileo system receiver, a Beidou navigation satellite system receiver, etc. The form of location data may be latitude-altitude coordinates or any other appropriate form. In an embodiment, the location data detected by the user equipment may be transmitted to one or more computer systems/servers 12 in the system so as to generate the road network skeleton.

According to an embodiment of the present invention, the road network skeleton, based on data representing a plurality of locations may be generated in any appropriate manner. For example, an image processing technology is be used to generate the road network skeleton. In an embodiment, rasterization processing is be utilized to construct the road network skeleton. Continuing in this embodiment, each location is regarded as a point on an image. A bitmap can be generated by rasterization processing to the points. Dislocation and morphological opening can be used to eliminate a hole in the image to form a route, and then the image is subject to smoothing and de-noising. A thinning operation may be utilized to process all routes in the image into a single-pixel width. It should be understood that the above method is an exemplary embodiment. According to an embodiment of the present invention, any appropriate image processing technology may be used to process a set of points representing the plurality of locations and generate the road network skeleton.

In this way, the road network skeleton may be generated quickly and directly, without temporarily considering the connection relationship and topological information between the locations, which helps to quickly obtain the rough information of the road network. The connection relationship and topological information may be compensated in area refinement at step S202, which will be described in detail below.

According to an embodiment of the present invention, the road network skeleton is not necessarily generated using the image processing technology. For example, in an alternative embodiment, the road network skeleton may also be provided by a third party. At this point, the road network skeleton may be requested and obtained from the third party so as to process it at step S201. For another example, in another embodiment, the road network skeleton may even be drawn manually or semi-manually by a user.

At step S201, any appropriate technology may be used to identify the target area to be refined in the road network skeleton. By way of example, in an embodiment, the road network skeleton may be first gridded. Then, the target area may be identified by gridded of the skeleton. In such an embodiment, the road network skeleton is divided into a plurality of areas. These areas may have the same predefined shape and size. Alternatively, different areas may also have different shapes and/or sizes. Then, the target area to be refined may be determined among these areas. Two or more areas may be processed in parallel, thereby enhancing the efficiency of the target area identification.

According to an embodiment of the present invention, the target area may be identified based on various factors. For example, in an embodiment, it is possible to determine the connectivity of the road network skeleton in various areas and detect, based on the connectivity, whether an area is the target area to be refined. As used herein, the term "connectivity" used here refers to the coherence degree of routes in an image or in a specific part of the image.

It may be advantageous to identify the target area using connectivity. When collecting location data using vehicles or pedestrians, the detected locations might not be continuous. For example, when a vehicle passes through a tunnel, since the satellite signals cannot be captured, the location of the vehicle in the tunnel is unavailable. In this case, when quickly generating the road network skeleton using rasterization processing, a path corresponding to the tunnel may be interrupted. By measuring the connectivity of the road network skeleton, such an area can be found, and in the subsequent refinement, topology of the road network may be improved. In this way, higher accuracy may be achieved while ensuring the road network generation efficiency.

According to an embodiment of the present invention, various kinds of appropriate technical means are utilized to measure the connectivity of the road network skeleton in a given area. For example, in an embodiment, for an area obtained by means of gridding, the number of routes in the area may be determined. The routes may include straight route segments and also include any shape of curved route segments. If the number of routes in the area is greater than a predetermined threshold, the area may be determined as the target area that needs further refinement. Alternatively or additionally, in an embodiment, the length of each segment of the route in the area may be calculated. If the number of routes whose length is smaller than the predetermined threshold length exceeds a predetermined threshold number, it indicates that the road network skeleton in the area is rather disintegrated. Therefore, at step S201, this area is determined as the target area that needs refinement.

Alternatively or additionally, pixel connectivity can also be used to measure the connectivity of the skeleton in a given area. For example, in a given area of the skeleton, if the number of 4-connectivity or 8-connectivity pixels is less than a predetermined threshold number, it may be determined that the connectivity of this area is poor. Therefore, this area may be identified as the target area at step S201. It should be understood that an embodiment described above are only exemplary, and any currently known or future developed connectivity measuring methods are all feasible.

Besides the connectivity, when identifying the target area, distribution of multiple locations for generating the road network skeleton between areas may also be considered. For example, in an embodiment, besides calculating the number of routes in an area, the number of known locations in the area may also be determined. In other words, it may be determined how many locations are within the area among the multiple locations for generating the road network skeleton. If the number of locations exceeds the predetermined threshold, and/or is apparently higher the average value of other areas, the area may be determined as to-be-defined target area.

When collecting location data by vehicles or pedestrians in an autonomous way, locations are always distributed unevenly. For example, location data in downtown areas may be many, while the location data in remote areas might be less. Therefore, poor connectivity in some areas might not be caused by loss of topological information when generating the skeleton, but caused by insufficient sample data. If the distribution of locations between respective areas is taken into account, such uneven location distribution can be effectively handled when identifying the target area, thereby identifying the target area that needs refinement more accurately and reducing the possibility of false detections.

Figure 3:
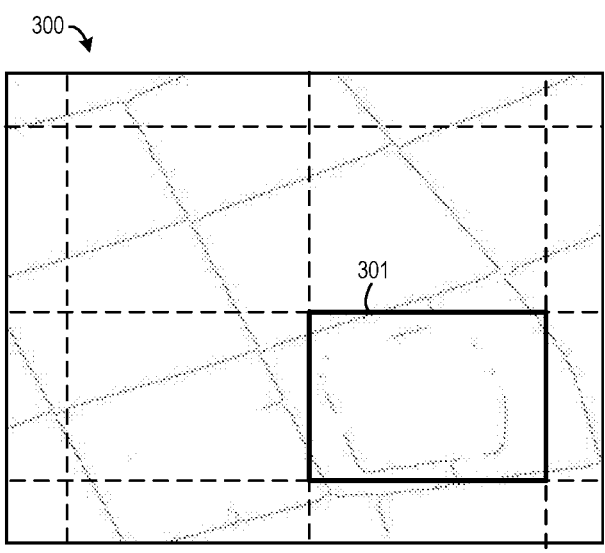
FIG. 3 shows a schematic diagram of an example of identifying a target area by gridding the road network skeleton according to an embodiment of the present invention.

FIG. 3 shows an example of identifying the target area by means of gridding. As shown, by use of the gridding operation, a road network skeleton 300 is divided into many areas. In this embodiment, respective areas have the same shape (rectangle) and size. Based on the connectivity and/or distribution of data, it is identified that an area 301 is the target area which needs refinement. It should be understood, although only one target area is identified in the example of FIG. 3, it is only for the purpose of illustration, not intended to make any limitation to the scope of the present invention. On the contrary, at step S201, it is likely to identify a plurality of target areas to be refined.

Moreover, it should be understood that the method of identifying the target area as described above is only an exemplary example. In addition to the connectivity and location distribution or as an alternative, any other related factors may be taken into account. For example, in one alternative embodiment, the user may be prompted to designate one or more target areas in the road network skeleton. In other words, user input is also one of factors that can be used to identify the target area. The scope of the present invention is not limited thereto.

Continuing with reference to FIG. 2, at step S202, the target area is refined using at least one trajectory associated with the target area identified at step S201, so as to generate the road network. As used herein, the term "trajectory" is used to refer to a series of locations experienced by a particular subject (a vehicle or a person) within a period of time. According to an embodiment of the present invention, if one trajectory is at least partially located within the target area, the trajectory is associated with the target area.

According to an embodiment of the present invention, the trajectory may be generated based on those locations that are used for generating the road network skeleton. Specifically, among multiple locations for generating the road network skeleton, a series of locations (referred to as "a first group of locations") of the same subject obtained within a period of time in the target area may be searched. The first group of locations form the trajectory associated with the target area. Through searching with respect to different subjects and/or within different periods of time, multiple trajectories associated with the target area might be obtained.

Alternatively or additionally, the trajectory can also be generated based on a second group of locations obtained after the road network skeleton is generated. It would be appreciated that the second group of locations is different from the multiple locations initially used for generating the skeleton. In other words, according to an embodiment of the present invention, after the skeleton of road network is generated, locations collected by one or more subjects can also be obtained continuously or periodically. With such incremental location data, one or more "new" trajectories may be generated. In this way, with the elapse of time, more and more new trajectories may be used for refining the target area, thereby constantly perfecting and/or updating the road network.

In an embodiment, the trajectory is directly generated when collecting location data. Specifically, when a server receives the group of locations continuously from a subject, the trajectory composed of this group of locations may be generated and stored. Alternatively, the trajectory may also be generated in response to query. For example, after identifying the target area, known location data may be queried to obtain locations within the target area. Then, among these locations as obtained, it is determined whether there exists locations continuously connected by a specific subject within a period of time. In the case of existence, the trajectory may be generated. The trajectory, for example, may be implemented as an array containing these locations. Optionally, metadata associated with the trajectory may also be stored to indicate relevant information such as subject and collection time and the like of collecting the trajectory.

Figure 4:
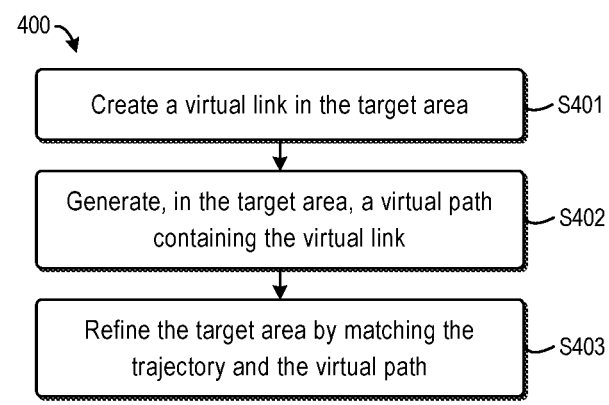
FIG. 4 shows a schematic diagram of an example of refining a target area according to an embodiment of the present invention.

According to an embodiment of the present invention, the trajectory information is used for connecting routes in the target area, thereby perfecting the connectivity of the road network skeleton. FIG. 4 shows a flow diagram of a method 400 for refining the target area using a trajectory according to an exemplary embodiment of the present invention. Method 400 is an exemplary embodiment of step S202 in the method 200.

As shown in FIG. 4, at step S401, a virtual link connecting a plurality of points in the target area is created. According to an embodiment of the present invention, the virtual link can be created in a plurality of different ways.

In an embodiment, one or more initial nodes in the target area are selected. As an example, in an embodiment, an end point of a longer route in the target area can be selected. Alternatively, an intersected point of two or more routes may be selected as the initial node. In another embodiment, a point corresponding to a location detected by a positioning device with a higher accuracy may be selected as the initial node. It should be noted that these selection criteria are only exemplary, not intended to limit the scope of the present invention. According to an embodiment of the present invention, other criteria may be leveraged to select a relatively reliable node in the target area as the initial node.

Next, for each initial node as selected, one or more candidate nodes in the target area can be selected based on a set of predefined constraints. In an embodiment, the predefined constraints may be spatial constraints, including, but not limited to: distance constraint, angle constraint, direction constraint, etc. For example, in an embodiment, the distance may prescribe that the distance between a candidate node and the initial node should be less than a predetermined threshold distance. For another example, in an embodiment, the distance constraint may prescribe: a point closest to the initial node and located on a different route from the initial node may be selected as a candidate node. Alternatively or additionally, the angle constraint may prescribe: the angle of a connecting route between the candidate node and the initial node with respect to the route where the initial node is located should be within a predefined range. It should be noted that these constraints are only exemplary, not intended to limit the scope of the present invention. According to an embodiment of the present invention, a candidate node may be selected based on any appropriate spatial constraint.

Figure 5:
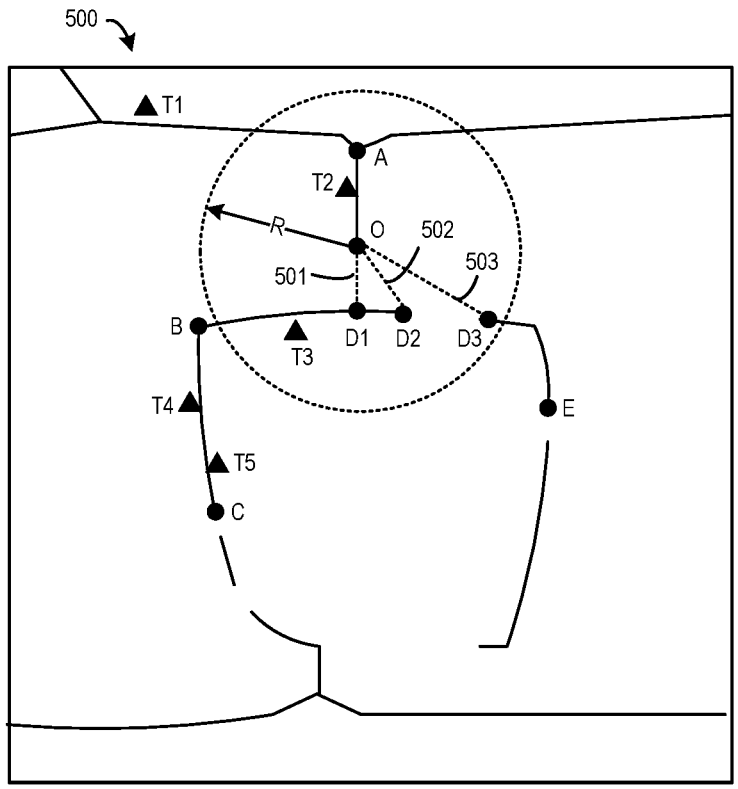
FIG. 5 shows a schematic diagram of an example for refining a target area according to an embodiment of the present invention.

As an example, FIG. 5 shows an example of selecting a candidate node. In the example shown in FIG. 5, the above mentioned two distance constraints are used, i.e., (1) the distance between a candidate node and an initial node is less than a predetermined threshold distance R; (2) the candidate node and the initial node are located on different routes, respectively. As shown in FIG. 5, in the target area 500, the candidate nodes D1, D2, and D3 are selected. Based on constraint (1), the candidate node D1 is closest to the initial node O in distance and located on a different route from the initial node O. Based on constraint (2), the three candidate nodes D1, D2, and D3 are all located within a round area with the initial node O as the center and the distance R as the radius.

It should be understood that although only one initial node O exists in the example of FIG. 5, it is only exemplary. The target area may have a plurality of initial nodes. Similarly, selection of multiple candidate nodes D1, D2, and D3 are only for exemplary purposes. For any initial node, it is also allowed to select a candidate node.

In addition to or instead of the spatial constraint, the candidate nodes may also be selected based on time constraints. For example, in an embodiment, the system may store detection time of each location. Correspondingly, in an embodiment, a time constraint may be prescribed as follows, for example, the difference between the detection time of the location corresponding to the initial node and the detection time of the location corresponding to a candidate node should be smaller than a predetermined threshold. If the detection times of the two locations have a large gap, this might indicate that the points corresponding to the two locations are close enough in distance, and there may not be a path between the two. By using the time constraint, it may be avoided to mistakenly generate a path between such nodes in subsequent operation.

Other appropriate constraints than the spatial and time constraints can be used as well. For example, in an embodiment, the number of candidate nodes can be restricted within the predetermined range. In this way, the missing detection of a path due to too few candidate nodes can be avoided, and meanwhile, degradation of the processing efficiency due to too many candidate nodes can also be avoided. Any other appropriate constraints may be used in combination with an embodiment of the present invention.

After selecting a candidate node, a virtual link may be created by connecting each initial node to a corresponding candidate node. For example, in FIG. 5, virtual links 501, 502, and 503 are created.

It would be understood that creating a virtual link by selecting an initial node and a candidate node is only an exemplary embodiment of the present invention, which is not intended to limit the scope of the present invention. For example, in an alternative embodiment, every two end points belonging to different routes within the target area may be simply connected to thereby form a plurality of virtual links.

Continuing with reference to FIG. 4, at step S402, one or more virtual paths are created in the target area, each virtual path including one or more virtual links created at step S401. Referring to FIG. 5, wherein the following three virtual paths may be created: virtual path A-O-D1-B-C containing virtual link 501; virtual path A-O-D2-D1-B-C containing virtual link 502; and virtual path A-O-D3-E containing virtual link 503.

Next, at step S403, at least one trajectory associated with the target area may be matched to the virtual path generated at step S402, thereby refining the target area. In an embodiment, the trajectory may be mapped into a point in the target area. As shown in FIG. 5, points T1, T2, T3, T4, and T5 are points corresponding to locations forming the trajectory.

Further, points T1 to T5 on the trajectory may be matched with the virtual path generated at step S402 by map matching. As already known, given a trajectory formed by multiple points, the map match process finds a path matching the trajectory most closely in the road network. Various map match technologies may be used in combination with an embodiment of the present invention. For example, in an embodiment, a cross-correlation method may be used to determine the match degree between the trajectory and the path. Alternatively, a serial detection approach, a hierarchical search approach, and an edge characteristic match approach and the like may be employed. The map match algorithm may return a path matching the given trajectory on the map. Alternatively, a match degree between the trajectory and the path may also be returned. The map match technology per se is known, which will not be detailed here.

According to an embodiment of the present invention, for any given virtual path, if the virtual path matches one trajectory, it may indicate that the trajectory passes through the virtual path. If the virtual path matches trajectories no less times than a predetermined match number, it indicates that the virtual path very likely exists in the true world. Therefore, the virtual link contained in the virtual path may be added to the road map, thereby realizing refinement of the target area.

In an embodiment, a predetermined match number is set to 1. In other words, in such an embodiment, as long as the virtual path matches any one of the trajectories, the corresponding virtual link may be directed added into the road network. For example, in the example shown in FIG. 5, the result of map match shows that trajectories T1 to T5 match the virtual paths A-O-D1-B-C (i.e., the match degree is greater than the predetermined threshold). Accordingly, the virtual link 501 may be added into the road network, thereby realizing refinement of the target area 500.

Alternatively, the predetermined match number may be set to greater than one. At this point, if the target area has enough correlated trajectories, for any given virtual path, its match degree with these trajectories may be determined. If the trajectories matching the virtual path is the same or greater than a predetermined match number, the corresponding virtual links may be added into the road network. On the other hand, if the number of matching trajectories does not reach a predetermined match number, or the number of the trajectories associated with the target area is less than the predetermined match number, an incremental match may be performed.

Specifically, based on the subsequently obtained location data, one or more new trajectories associated with the target area may be generated. These new trajectories may match the virtual path. For example, in an embodiment, after the system detects a trajectory associated with a certain target area in a subsequent operation, refinement of the target area may be further triggered. Correspondingly, the virtual path can be matched with the new trajectory. Only when the accumulative match number reaches the predetermined match number, can the virtual link in the virtual path be added into the road network. In this way, it may be determined more reliably and accurately whether a virtual path exists in the real world, thereby enhancing the accuracy of the refinement operation. With the constant accumulation of incremental data, the road network may be constantly perfected and updated.

Figure 6:
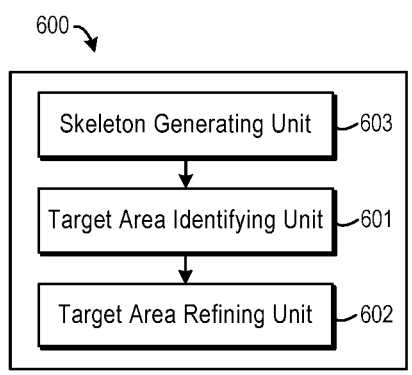
FIG. 6 shows a schematic block diagram of a system for generating a road network according to an embodiment of the present invention.

FIG. 6 shows a block diagram of a system 600 for generating the road network according to an embodiment of the present invention. As shown, the system 600 includes a target area identifying unit 601 configured to identify the target area to be refined in the road network skeleton; and a target area refining unit 602 configured to refine the target area using at least one trajectory associated with the target area, to generate the road network.

In an embodiment, the system 600 may further include a skeleton generating unit 603 configured to generate the skeleton by rasterization processing based on location data representing a plurality of locations. It is to be understood that according to an embodiment of the present invention, the skeleton generating unit 603 is optional, as discussed above.

In an embodiment, the system 600 may further include an area dividing unit configured to divide the skeleton into a plurality of areas. In such an embodiment, the target area identifying unit 601 may be configured to identify the target area in the plurality of areas.

In an embodiment, the system 600 may further include a connectivity determining unit configured to determine connectivity of the skeleton in the plurality of areas. In such an embodiment, the target area identifying unit 601 may be configured to identify the target area at least in part based on the connectivity.

In an embodiment, the system 600 may also include a location distribution unit configured to determine distribution of the plurality of locations for generating the skeleton among the plurality of areas. In such an embodiment, the target area identifying unit 601 may be configured to identify the target area based on the connectivity and the distribution.

In an embodiment, at least one trajectory may be generated based on at least one of the following: a first group of locations that are used for generating the skeleton and located in the target area; and a second group of locations that are obtained after the skeleton is generated and located in the target area.

In an embodiment, the target area refining unit 602 may include a virtual link creating unit configured to create a virtual link connecting points in the target area; a virtual path generating unit configured to generate a virtual path containing the virtual link in the target area; and a matching unit configured to match the at least one trajectory and the virtual path to refine the target area.

In an embodiment, the virtual link creating unit may include an initial node selecting unit configured to select an initial node in the target area; a candidate node selecting unit configured to select a candidate node in the target area based on the initial node and predefined constraints; and a node connecting unit configured to connect the initial node and the candidate node to create the virtual link. In an embodiment, the predefined constraints may include at least one of a spatial constraint and a time constraint.

In an embodiment, the target area refining unit 602 may include a link adding unit configured to, in response to the virtual path matching a predetermined number of trajectories in the at least one trajectory, add the virtual link contained in the virtual path into the road network.

It should be noted that for the sake of clarity, FIG. 6 does not show optional units or sub-units included in the system 600. All features and operations as described above may be suitable for the system 600, respectively, which are therefore not detailed here. Moreover, partitioning of units or subunits in system 600 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the system 600 may be implemented by various manners, including software, hardware, firmware or a random combination thereof. For example, in an embodiment, the apparatus may be implemented by software and/or firmware. Alternatively or additionally, the system 600 may be implemented partially or completely based on hardware. for example, one or more units in the system 600 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may include copper transmission cables, optical transmission fibers, wireless transmission, routers, firewalls, switches, gateway computers and/or edge servers. A network adapter card or network interface in each computing processing device receives computer readable program instructions from the network and forwards the computer readable program instructions for storage in a computer readable storage medium within the respective computing processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to an embodiment of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to an embodiment disclosed. Many modifications and variations will be apparent to those of ordinary skill in the art without departing from the scope and spirit of a described embodiment. The terminology used herein was chosen to best explain the principles of an embodiment, the practical application or technical improvement over technologies found in the marketplace, or to enable others of ordinary skill in the art to understand an embodiment disclosed herein.

What is claimed is:

1. A computer program product for improving a computer functionality by generating an improved road network, the computer program product comprising:
    one or more non-transitory computer-readable storage media and program instructions stored on the one or more non-transitory computer-readable storage media, the program instructions comprising:
    program instructions to receive, from a user, a target area to be refined in a road network skeleton;
    program instructions to create, by a computer, a virtual link connecting points in the target area;
    program instructions to generate, by the computer, in the target area, a virtual path containing the virtual link;
    program instructions to refine, by the computer, the target area by program instructions to match at least one trajectory, stored on a server, associated with the target area to generate the improved road network including the virtual path; and
    program instructions to provide the user the improved road network with the refined target area via a display.

2. The computer program product according to claim 1, further comprising:
    program instructions to generate, by the computer, the road network skeleton by rasterization processing based on location data representing a plurality of locations.

3. The computer program product according to claim 1, wherein program instructions to receive the target area further comprises:
    program instructions to divide, by the computer, the road network skeleton into a plurality of areas; and
    program instructions to identify, by the computer, the target area in the plurality of areas.

4. The computer program product according to claim 3, wherein program instructions to identify the target area in the plurality of areas further comprises:
    program instructions to determine, by the computer, a connectivity of the road network skeleton in the plurality of areas; and
    program instructions to identify, by the computer, the target area at least in part based on the determined connectivity.

5. The computer program product according to claim 4, wherein program instructions to identify the target area at least in part based on the determined connectivity comprises:
    program instructions to determine, by the computer, a distribution of a plurality of locations for generating the road network skeleton among the plurality of areas; and
    program instructions to identify, by the computer, the target area based on the connectivity and the determined distribution.

6. The computer program product according to claim 1, wherein the at least one trajectory is generated based on at least one of:
    a first group of locations that are used for program instructions to generate the road network skeleton and located in the target area; and
    a second group of locations that are obtained after the road network skeleton is generated, and is located in the target area.

7. The computer program product according to claim 1, wherein program instructions to create the virtual link connecting points in the target area comprises:
    program instructions to select, by the computer, an initial node in the target area;
    program instructions to select, by the computer, a candidate node in the target area based on the initial node and a predefined constraint; and
    program instructions to create, by the computer, the virtual link by program instructions to connect the initial node and the candidate node.

8. The computer program product according to claim 7, wherein the predefined constraint comprises at least one of a spatial constraint and a time constraint.

9. The computer program product according to claim 1, wherein program instructions to refine the target area by program instructions to match the at least one trajectory and the virtual path comprises:
    program instructions to add, by the computer, the virtual link contained in the virtual path into the road network in response to the virtual path matching a predetermined number of trajectories in the at least one trajectory.

10. A computer system improving a computer functional by generating an improved road network, the computer system comprising:
    one or more computer processors, one or more non-transitory computer-readable storage media, and program instructions stored on the one or more of the non-transitory computer-readable storage media for execution by at least one of the one or more processors, the program instructions comprising:
    program instructions to receive, from a user, a target area to be refined in a road network skeleton;
    program instructions to create, by a computer, a virtual link connecting points in the target area;
    program instructions to generate, by the computer, in the target area, a virtual path containing the virtual link;

program instructions to refine, by the computer, the target area by program instructions to match at least one trajectory, stored on a server, associated with the target area to generate the improved road network including the virtual path; and program instructions to provide the user the improved road network with the refined target area via a display.

11. The computer system according to claim 10, further comprising:

program instructions to generate, by the computer, the road network skeleton by rasterization processing based on location data representing a plurality of locations.

12. The computer system according to claim 10, wherein program instructions to receive the target area further comprises:

program instructions to divide, by the computer, the road network skeleton into a plurality of areas; and program instructions to identify, by the computer, the target area in the plurality of areas.

13. The computer system according to claim 12, wherein program instructions to identify the target area in the plurality of areas further comprises:

program instructions to determine, by the computer, a connectivity of the road network skeleton in the plurality of areas; and program instructions to identify, by the computer, the target area at least in part based on the determined connectivity.

14. The computer system according to claim 13, wherein program instructions to identify the target area at least in part based on the determined connectivity comprises:

program instructions to determine, by the computer, a distribution of a plurality of locations for generating the road network skeleton among the plurality of areas; and program instructions to identify, by the computer, the target area based on the connectivity and the determined distribution.

15. The computer system according to claim 10, wherein the at least one trajectory is generated based on at least one of:

a first group of locations that are used for program instructions to generate the road network skeleton and located in the target area; and a second group of locations that are obtained after the road network skeleton is generated, and is located in the target area.

16. The computer system according to claim 10, wherein program instructions to create the virtual link connecting points in the target area comprises:

program instructions to select, by the computer, an initial node in the target area;

program instructions to select, by the computer, a candidate node in the target area based on the initial node and a predefined constraint; and program instructions to create, by the computer, the virtual link by program instructions to connect the initial node and the candidate node.

17. The computer system according to claim 16, wherein the predefined constraint comprises at least one of a spatial constraint and a time constraint.

18. The computer system according to claim 10, wherein program instructions to refine the target area by program instructions to match the at least one trajectory and the virtual path comprises:

program instructions to add, by the computer, the virtual link contained in the virtual path into the road network in response to the virtual path matching a predetermined number of trajectories in the at least one trajectory.

* * * * *